US012169992B2

(12) United States Patent
Seenivasagam et al.

(10) Patent No.: US 12,169,992 B2
(45) Date of Patent: Dec. 17, 2024

(54) SYSTEM AND METHOD FOR IDENTIFYING AND VERIFYING ONE OR MORE INDIVIDUALS USING FACIAL RECOGNITION

(71) Applicant: VeriScan, LLC, Alexandria, VA (US)

(72) Inventors: Dhamotharakkannan Seenivasagam, Alexandria, VA (US); Goutam Kundu, Alexandira, VA (US); Justin Dominic Grasso, Alexandria, VA (US); Sushant Gulati, Alexandria, VA (US); Satyanarayana Ramisetty, Washington, DC (US); Yann Macario Antoine Sendra, Washington, DC (US); Kevin Donta Poplar, Washington, DC (US); Balaji Karuppiah, Washington, DC (US)

(73) Assignee: veriScan, LLC, Alexandria, VA (US)

( * ) Notice: Subject to any disclaimer, the term of this patent is extended or adjusted under 35 U.S.C. 154(b) by 234 days.

(21) Appl. No.: 17/653,772

(22) Filed: Mar. 7, 2022

(65) Prior Publication Data

US 2022/0270426 A1    Aug. 25, 2022

Related U.S. Application Data

(63) Continuation of application No. 16/211,976, filed on Dec. 6, 2018, now Pat. No. 11,321,983.

(60) Provisional application No. 62/690,346, filed on Jun. 26, 2018.

(51) Int. Cl.
| | | |
|---|---|---|
| G07C 9/37 | (2020.01) | |
| G06V 40/16 | (2022.01) | |
| H04L 9/32 | (2006.01) | |
| H04L 9/40 | (2022.01) | |
| H04W 12/06 | (2021.01) | |

(52) U.S. Cl.
CPC ............. *G07C 9/37* (2020.01); *G06V 40/168* (2022.01); *H04L 9/3231* (2013.01); *H04L 63/0428* (2013.01); *H04W 12/06* (2013.01); H04L 2209/80 (2013.01)

(58) Field of Classification Search
CPC ...... G07C 9/37; G06V 40/168; H04L 9/3231; H04L 63/0428; H04L 12/06
See application file for complete search history.

(56) References Cited

U.S. PATENT DOCUMENTS

| | | |
|---|---|---|
| 9,245,175 B1 | 1/2016 | Vladimir et al. |
| 9,294,474 B1 | 3/2016 | Alikhani |
| 9,563,761 B1* | 2/2017 | Ziraknejad ............. G06F 21/32 |
| 11,321,983 B2 | 5/2022 | Seenivasagam et al. |
| 2003/0142853 A1 | 7/2003 | Waehner et al. |
| 2003/0215114 A1 | 11/2003 | Kyle |
| 2003/0217294 A1 | 11/2003 | Kyle |
| 2007/0186106 A1* | 8/2007 | Ting .................... H04L 63/0815 713/168 |
| 2012/0054862 A1 | 3/2012 | Jevans et al. |
| 2013/0008958 A1 | 1/2013 | Smith et al. |
| 2016/0173501 A1 | 6/2016 | Brown |
| 2016/0269399 A1 | 9/2016 | Abreu |
| 2017/0103194 A1* | 4/2017 | Wechsler ............... G06F 21/316 |
| 2017/0132504 A1* | 5/2017 | Kurian ............... G06K 19/0727 |
| 2017/0279801 A1 | 9/2017 | Andrade |
| 2018/0089971 A1 | 3/2018 | Campero et al. |
| 2018/0115540 A1 | 4/2018 | Moiyallah et al. |
| 2018/0248891 A1* | 8/2018 | Tamma .................. H04L 67/52 |
| 2019/0172281 A1* | 6/2019 | Einberg .................. G06F 3/013 |
| 2019/0392659 A1 | 12/2019 | Seenivasagam et al. |

FOREIGN PATENT DOCUMENTS

| | | |
|---|---|---|
| EP | 2993619 A1 | 3/2016 |
| JP | 2011198227 A | 10/2011 |
| JP | 2012137879 A | 7/2012 |
| JP | 2015194930 A | 11/2015 |
| JP | 2016053896 A | 4/2016 |
| WO | 2015136938 A1 | 9/2015 |
| WO | 2020006111 A1 | 1/2020 |

* cited by examiner

*Primary Examiner* — Mishawn N. Hunter
(74) *Attorney, Agent, or Firm* — Mintz Levin Cohn Ferris Glovsky and Popeo, P.C.

(57) ABSTRACT

The invention encompasses systems and methods for identification, verification, and authentication of an individual by obtaining a biometric feature (e.g., facial recognition) of an individual using a mobile device (e.g., a mobile device camera). The system and method includes receiving from a mobile device biometric data of an individual captured by the mobile device (e.g., a camera on a mobile tablet), storing and encrypting the biometric data, securely forwarding the encrypted biometric data to a known server or database and receiving a request from the mobile device for authenticating of the individual, the request including biometric data captured by the mobile device, comparing the biometric data to known data of the individual stored on a database or server and the biometric data included in the request, and sending to the mobile device a response to the request for authenticating the individual based on a result of the comparison, wherein the response to the request allows verification of the individual and access to the individual to a secured area.

15 Claims, No Drawings

SYSTEM AND METHOD FOR IDENTIFYING AND VERIFYING ONE OR MORE INDIVIDUALS USING FACIAL RECOGNITION

CROSS-REFERENCE TO RELATED APPLICATIONS

This application is a continuation of U.S. patent application Ser. No. 16/211,976, filed on Dec. 6, 2018 and entitled "System and Method for Identifying and Verifying One or More Individuals Using Facial Recognition", the entire contents of which are hereby expressly incorporated by reference herein. U.S. patent application Ser. No. 16/211,976 claims benefit of priority under 35 U.S.C. § 119(e) to U.S. Provisional Application No. 62/690,346, filed on Jun. 26, 2018.

FIELD OF THE INVENTION

The invention encompasses systems and methods for identification, verification, and authentication of an individual by obtaining a biometric feature (e.g., facial recognition) of an individual using a mobile device (e.g., a mobile device camera). The system and method includes receiving from a mobile device biometric data of an individual captured by the mobile device (e.g., a camera on a mobile tablet), storing and encrypting the biometric data, securely forwarding the encrypted biometric data to a known server or database and receiving a request from the mobile device for authenticating of the individual, the request including biometric data captured by the mobile device, comparing the biometric data to known data of the individual stored on a database or server and the biometric data included in the request, and sending to the mobile device a response to the request for authenticating the individual based on a result of the comparison, wherein the response to the request allows verification of the individual and access to the individual to a secured area.

BACKGROUND OF THE INVENTION

Checking physical identification of persons desiring to pass through a gate or secured area is well known and are often limited by, for example, the delay in physical identification and costs associated with person checking the physical identification. Electronic gatekeepers in lieu of human monitors are also known, which include systems using expensive technologies such as gates and scanning machines that scan a ticket or a coded magnetic card. However, such systems are slow and often expensive to incorporate.

Airport terminals, port entrances and exits, or train stations are places where unspecified masses frequently enter and exit such facilities and where several tens of thousands of individuals can pass in only one day. Further, the public office such as the central government complex is one of these examples. In each of these instances the volume of people results in delay, added costs, and unnecessary manpower.

Thus, there is a need for a real-time, seamless identification system that accurately identifies, authenticates, and verifies the identify of an individual to allow access to a secured area in an efficient and accurate manner.

SUMMARY OF THE INVENTION

The invention generally encompasses systems and methods for authenticating and verifying the identity of one or more individuals such as, for example, a passenger, guest, an employee, a system administrator, security personnel (e.g., security, police, fire fighters, Homeland Security personnel and subordinate agencies such as Customs and Border Protection officers, etc.) by obtaining a biometric feature of an individual using a camera included, for example, on a mobile device.

In another embodiment, the invention encompasses systems and methods that are interrelated among one or more agencies or administrations (e.g., CBP and TSA) that allow for real-time, seamless communication among the systems to authenticate and verify the identity of one or more individuals. In certain embodiments, the invention encompasses systems and methods that are interrelated between, for example, an airline and U.S. Customs and Border Protection (CBP) that allow for real-time, seamless communication between the airline and CBP to authenticate and verify the identity of one or more individuals. In certain embodiments, if the identity of one or more individuals is not authenticated and/or verified, the individual can be manually (e.g., physically identified in person) cleared. In other embodiments, the system and method can be used in any setting requiring authorization and/or verification for access, settings including, but not limited to, schools, hospitals, prisons, sporting venues, etc.

In another embodiment, the invention encompasses a system and method to capture and securely transmit encrypted data remotely (e.g., through the cloud—servers, storage, databases, networking, software, analytics, intelligence over the Internet) in compliance with various security parameters. In a specific embodiment, the invention encompasses a system and method to capture at least one physical feature of an individual (e.g., facial recognition) from an airline or airline gate and securely transmitting the encrypted data remotely to security personnel (e.g., CBP) in compliance with CBP requirements and validating and confirming that a physical feature of an individual captured conforms with a physical feature of an individual in a server or database of CBP, and returning an indication regarding verification of the confirmation of the individual.

In another embodiment, the invention encompasses a real-time, single pass validation system and method wherein the identity of an individual is confirmed using at least one physical feature of an individual with a security database or server (e.g., CBP) allowing seamless entry to an airplane or an airline.

In another embodiment, the invention encompasses a system and method for real-time, seamless communication among one or more systems to authenticate and verify the identity of one or more individuals and concurrently operate as an analytics platform to process data on said individuals or related data (e.g., speed of verification, time for authentication, time for confirmation) to provide data analytics through a public, private or hybrid cloud environment. As used herein, cloud analytics broadly refers to a service model wherein data sources, data models, processing applications, computing power, analytic models, and sharing or storage of results are implemented within a cloud environment to perform one or more aspects of analytics.

In another embodiment, the invention encompasses a system and method to capture and securely transmit encrypted data remotely (e.g., through the cloud—servers, storage, databases, networking, software, analytics, intelligence over the Internet) in compliance with various security parameters. In a specific embodiment, the invention encompasses a system and method to capture at least one physical feature of an individual (e.g., facial recognition) from an airline and securely transmitting the encrypted data remotely to security personnel (e.g., CBP) in compliance with CBP requirements and validating and confirming that the physical feature of an individual captured conforms with the physical feature of the individual in a server or database of CBP, and returning an indication regarding verification of the confirmation of the individual. The invention further encompasses integration of the system and methods with two or more entities in an airport including, but not limited to, CBP and the Transportation Security Administration (TSA) in which the capture at least one physical feature of an individual (e.g., facial recognition) is securely transmitted using encrypted data remotely to CBP and TSA or other administration or personnel in an airport.

In certain embodiments, the invention encompasses a system for identifying and/or verifying one or more individuals comprising: a device comprising a processor and a non-transitory computer-readable medium comprising instructions that, when executed by the processor of the device, cause the device to perform operations including a camera for capturing an image of the individual; a means for transmitting said image from the device to a server or database storing access verification information for the individual comprising at least one discernible physical feature recognition information for the individual, a means for identification of the individual, and access authorization for the individual; a data validating means for validating that the image on the device matches that of the server or database; wherein validating the image comprises matching the captured image with one or more previously received images of the individual; an individual interface for displaying a received image; confirming the image on the individual interface of the device is that of the individual in the server or database; and returning an indication to the device regarding verification of access for the one or more individuals.

In certain embodiments, the invention further comprises an information collection device for collecting information on the individuals.

In certain embodiments, the access verification information device includes a data input device for receiving identification information and access authorization information for the individual; and an image capture device for capturing an image of the individual for extracting a discernible physical feature recognition information for the individual, the discernible physical feature recognition information for the individual being associated with the received identification information and access authorization information for the individual stored in the database.

In certain embodiments, each access verification information entry further comprises a period of accessibility for the individual within a facility, the access resolution device purging the access verification information for the individual at an expiration of the period of accessibility for the individual.

In certain embodiments, the period of accessibility is defined according to one of an elapsed time or occurrence of a monitored event in the facility.

In certain embodiments, the facial recognition comprises at least one discernible physical feature of the individual.

In certain embodiments, the system includes a color coded display for each observed individual as to a status of the verification of access for the individual.

In certain embodiments, the status of the verification of the access for the individual being an explicit indication of access authorized, access denied or status unknown.

In certain embodiments, the system is supplemented with other information regarding at least one of identification of the individual and information related to access verification for the individual.

In certain embodiments, the system further comprises a geographic location of the device (e.g., GPS).

In another embodiment, the invention encompasses methods for identifying and/or verifying one or more individuals comprising: a device comprising a processor and a non-transitory computer-readable medium comprising instructions that, when executed by the processor of the device, cause the device to perform operations comprising:
capturing an image of the person using a camera of the device;
transmitting said image from the device to a server or database storing access verification information for the individual comprising at least one discernible physical feature recognition information for the individual, identification of the individual, and access authorization for the individual;
validating that the image on the device matches that of the server or database; wherein validating the image comprises matching the captured image with one or more previously received images of the individual;
displaying the received image on an individual interface of the device;
confirming the image on the individual interface of the device is that of the individual in the server or database; and
returning an indication to the device regarding verification of access for the one or more individuals.

In certain embodiments, the method further comprises an information collection device for collecting information relating to the individuals.

In certain embodiments, the access verification information method comprises receiving identification information and access authorization information for the individual and capturing an image of the individual for extracting discernible physical feature recognition information for the individual, the discernible physical feature recognition information for the individual being associated with the received identification information and access authorization information for the individual and stored in the database.

In certain embodiments of the method each access verification information entry further comprises a period of accessibility for the individual within a facility, the access resolution device purging the access verification information for the individual at an expiration of the period of accessibility for the individual.

In certain embodiments, the method the period of accessibility being defined according to one of an elapsed time or occurrence of a monitored event in the facility.

In certain embodiments, the method of facial recognition comprises at least one discernible physical feature of the individual.

In certain embodiments, the method includes a color coded display for each observed individual as to a status of the verification of access for the individual.

In certain embodiments, the status of the verification of the access for the individual being an explicit indication of access authorized, access denied or status unknown.

In certain embodiments, the method is supplemented with other information regarding at least one of identification of the individual and information related to access verification for the individual.

In certain embodiments the method further comprises a geographic location of the device (e.g., GPS).

Other embodiments of the invention encompass systems and methods for identifying an individual including one or more of the following steps: a) obtaining and/or retrieving individualized identification information (e.g., biometric information) including an individualized identification hash of a first individual where the individualized identification hash comprises individualized biometric data of said first individual; retrieving the individualized biometric data of the said first individual; accessing at least one database comprising a plurality of biometric data of one or more individuals including data of said first individual; hashing biometric data to form a plurality of database identification hashes; comparing each of the plurality of database identification hashes to the first individualized identification hash; and reporting whether a match of any of the plurality of database identification hashes to the individualized identification hash is identified.

In certain embodiments, the individualized identification information may include biometric data selected from the group consisting of a fingerprint scan data, iris scan data, retinal scan data, facial recognition scan data, dynamic gait data, and body geometry scan data and DNA data, wherein the DNA data is selected from the group consisting of a STR profile, a SNP profile, an INDEL profile, and an Alu element.

In some embodiments, the method may include the steps of retrieving individualized biometric data; accessing at least one database comprising a plurality of biometric data; comparing each of the plurality of database biometric data to the individualized biometric data; and reporting a match of the database biometric data to the individualized biometric data.

In some of the embodiments of the method, the method may also include steps of retrieving a partial individualized identification hash; comparing the plurality of database identification hashes with the partial individualized identification hashes; and reporting whether a match is identified.

In other embodiments, the method may further includes the steps of comparing each of the plurality of the partial individualized identification hashes to each of the plurality of the partial interrogation database biometric hashes; and reporting whether a match is identified.

In some embodiments, the method also may include the steps of: obtaining first individualized biometric data and confirming the individualized biometric data at the point of contact. In some other embodiments, the method further includes the steps of: accessing a database; retrieving a verification or authentication; and determining whether the verification is valid.

In another embodiment, the invention encompasses systems and methods for authentication using biometric tokenization. Various embodiments of the invention encompass tokenization, which is generally described as utilizing a "token" (e.g., a substitute, surrogate, or other like identifier) as a replacement for sensitive account information such as account numbers. As such, biometric tokens or portions of tokens may be used as a stand in for a user account number, user name, pin number, routing information related to an account, security code, or other like information relating to the user account obtained and verified using biometric data.

In certain embodiments, one or more biometric tokens may be utilized as an instrument to complete a transaction. The one or more tokens may be associated with one or more devices. In other embodiments, the biometric token may be associated with electronic transactions that are made over the Internet instead of using a physical device. Utilizing a biometric token instead of actual account information, and specifically an account number, improves security, and provides flexibility and convenience in controlling the transactions, controlling accounts used for the transactions, and sharing transactions between various users.

In various embodiments, a mobile device may include a camera and may include one or more active electronic devices such as processors and/or communication device(s). In some embodiments, the device(s) may include one or more biometric detection and/or processing device(s). Such biometric device(s) may detect one or more biometric characteristics of the individual, process the characteristic(s) and confirm the identity of the individual. In some embodiments, the biometric device(s) send biometric information corresponding to the biometric characteristics of the user to a server, which then accesses stored biometric data corresponding to the individual to confirm the individual's identity and authorizes the individual. In other cases, the device themselves confirm the identity of the individual and simply communicates the identity of the individual and/or confirmation of the identity of the individual. In some cases, such biometric authentication may modify the level of authentication necessary for the individual to perform one or more transactions. In certain embodiments, different levels of authentication may correspond to different levels of functionality, access and/or transaction abilities. For example, if the individual's identity is authenticated, then the individual may be granted access without providing further identification.

DETAILED DESCRIPTION OF THE INVENTION

The invention encompasses a system and method for secure and convenient facial recognition authentication. In certain embodiments, the system and method include a mobile device and may be used without the need for additional expensive biometric readers or systems while offering enhanced security over conventional facial recognition systems.

In certain embodiments, a mobile device is capable of capturing a picture of an individual, such as an image of the individual's face. In certain embodiments, a camera is incorporated or connected to the mobile device to capture an image or multiple images or video of an individual. The mobile device may include any type of mobile device capable of capturing an image, either still or video, and performing processing of the image or communication over a network.

In another embodiment, the camera may be configured to create an image from visible light as well as infrared light. The camera may additionally or alternatively employ image intensification, active illumination, or thermal vision to obtain images in dark environments.

In certain embodiments, when pointed toward an individual, the camera may capture an image of the individual's face. The camera may be part of a module that may either include communication capability that communicates with either a mobile device, such as via Bluetooth®, or other format, or communication directly with a network over a wired or wireless link. The mobile device may relay communications to the network. The mobile device may be configured with more than one front facing camera to provide for a 3D or stereoscopic view, or to obtain images across a different spectral ranges, such as near infrared and visible light.

In certain embodiments, the mobile device is configured to wirelessly communicate over a network with a remote server. In certain embodiments, the server may communicate with one or more databases, for example, a database operated by CBP. In certain embodiments, the network may be any type of network capable of communicating to and from the mobile device including, but not limited to, a LAN, WAN, PAN, or the Internet. In certain embodiments, the mobile device may communicate with the network via a wired or wireless connection, such as via Ethernet, WiFi, and the like. In certain embodiments, the server may include any type of computing device capable of communicating with the mobile device. In certain embodiments, the server and mobile device are configured with a processor and memory and are configured to execute machine readable code or machine instructions stored in the memory.

In certain embodiments, the database, stored on mobile device or remote location for example, a CBP or Homeland Security database, may contain facial biometric information and authentication information of one or more individuals to identify the individuals to allow access to a secured area based on one or more images or biometric information received from the mobile device. The data may include, for example, authenticating or verifying information relating to an individual including matching facial recognition data or any identifying information of one or more individuals. The term biometric data may include among other information biometric information concerning facial features and path parameters. Examples of path parameters may include an acceleration and speed of the mobile device, angle of the mobile device during image capture, distance of the mobile device to the individual, path direction in relation to the individual's face position in relation to the individual, or any other type parameter associated with movement of the individual's face in relation to a camera. Other data may also be included such as GPS data, device identification information, and the like.

In another embodiment, the server processes requests for identification from the mobile device. In one embodiment, the image captured by the mobile device, using facial detection, comprises one or more images of the individual's face by the mobile device. In another configuration, the mobile device camera calculates biometric information from the obtained images and sends the biometric information in an encrypted manner to the server. In yet another embodiment, the mobile device camera sends encrypted facial image data, which is then compared with biometric information that is stored biometric information on a server, and sends a authentication result from the comparison from the server back to the mobile device to allow access to a secure area (e.g., an airplane).

In certain embodiments, the data including either the images, biometric information, or both are sent over the network to the server. Using image processing and image recognition algorithms, the server processes the person's biometric information, such as facial data, and compares the biometric information with biometric data stored in the database to determine the likelihood of a match. In other embodiments, the image processing and comparison is done on the mobile device and data sent to the server indicates a result of the comparison.

By using facial recognition processing, an accurate identity match may be established. Based on this and optionally one or more other factors, access may be granted or may be rejected.

In certain embodiments, the invention includes a second server with associated second database, and third server with associated third database, or multiple databases. The second and third database may be provided to contain additional information that is not available on the first server and first database.

In certain embodiments, executing on the mobile device is one or more software applications. In certain embodiments, the software may be configured with either or both of facial detection and facial recognition and one or more software modules which monitor the path parameters and/or biometric data. Facial detection as used herein refers to a process which detects a face in an image. Facial recognition as used herein refers to a process that is capable of analyzing a face using an algorithm, mapping its facial features, and converting them to biometric data, such as numeric data. The biometric data can be compared to that derived from one or more different images for similarities or dis-similarities. If a high percentage of similarity is found in the biometric data, the individual shown in the images may be considered to be a match.

In certain embodiments, the invention matches a face of an individual to an identity or image stored in a database, to authenticate the individual, the application software may first process the image captured by the camera to identify and locate the face that is in the image.

The portion of the image that contains the detected face may then be cropped, cut, and stored for processing by one or more facial recognition algorithms. By first detecting the face in the image and cropping only that portion of the face, the facial recognition algorithm need not process the entire image. Further, in embodiments where the facial recognition processing occurs much less image data is required to be sent over the network to the remote location. It is contemplated that the entire image, a cropped face, or only biometric data may be sent to a remote server for authentication and verification.

In certain embodiments, facial detection software is capable of detecting a face from a variety of angles. However, facial recognition algorithms are most accurate in straight-on images in well-lit situations. In one embodiment, the highest quality face image for facial recognition that is captured is processed first, then images of the face that are lower quality or at different angles other than straight toward the face are then processed. The processing may occur on the mobile device or at a remote server which has access to large databases of image data or facial identification data. The facial detection is preferred to occur on the mobile device and is performed by the mobile device software. This reduces the number or size of images (data) that are sent to the server for processing where faces are not found and minimizes the overall amount of data that must be sent over the network. This reduces bandwidth needs and network speed requirements are reduced. In another embodiment, the facial detection, facial recognition, and biometric comparison all occur on the mobile device. However, it is contemplated that the facial recognition processing may occur on the mobile device, a remote server, or both.

In certain embodiments, the mobile device may comprise any type of mobile communication device capable of capturing an image of an individual. The mobile device may comprise a PDA, cellular telephone, smart phone, tablet PC, wireless electronic pad, or any other computing device.

In certain exemplary embodiments, the mobile device is configured with an outer housing configured to protect and contain the components. Within the housing is a processor and a first and second bus. The processor communicates over the buses with the other components of the mobile device. The processor may comprise any type processor or controller capable of performing as described herein. The processor may comprise a general purpose processor, ASIC, ARM, DSP, controller, or any other type processing device. The processor and other elements of the mobile device receive power from a battery or other power source. An electrical interface provides one or more electrical ports to electrically interface with the mobile device, such as with a second electronic device, computer, a medical device, or a power supply/charging device. The interface may comprise any type electrical interface or connector format.

One or more memories are part of the mobile device for storage of machine readable code for execution on the processor and for storage of data, such as image data, audio data, individual data, medical data, location data, accelerometer data, or any other type of data. The memory may comprise RAM, ROM, flash memory, optical memory, or micro-drive memory. The machine readable code as described herein is non-transitory.

In certain embodiments, the processor connects to an individual interface. The individual interface may comprise any system or device configured to accept individual input to control the mobile device. The individual interface may comprise one or more of the following: keyboard, roller ball, buttons, wheels, pointer key, touch pad, and touch screen. A touch screen controller is also provided which interfaces through the bus and connects to a display.

In certain embodiments, the display comprises any type display screen configured to display visual information to the individual. The screen may comprise a LED, LCD, thin film transistor screen, OEL CSTN (color super twisted nematic), TFT (thin film transistor), TFD (thin film diode), OLED (organic light-emitting diode), AMOLED display (active-matrix organic light-emitting diode), capacitive touch screen, resistive touch screen or any combination of these technologies. The display receives signals from the processor and these signals are translated by the display into text and images as is understood in the art. The display may further comprise a display processor or controller that interfaces with the processor. The touch screen controller may comprise a module configured to receive signals from a touch screen which is overlaid on the display.

In certain embodiments, an exemplary mobile device includes a speaker and microphone. The speaker and microphone may be controlled by the processor. The microphone is configured to receive and convert audio signals to electrical signals based on processor control. Likewise, the processor may activate the speaker to generate audio signals. These devices operate as is understood in the art and as such are not described in detail herein.

In certain embodiments, one or more of the buses is a first wireless transceiver and a second wireless transceiver, each of which connect to respective antennas. The first and second transceiver are configured to receive incoming signals from a remote transmitter and perform analog front end processing on the signals to generate analog baseband signals. The incoming signal may be further processed by conversion to a digital format, such as by an analog to digital converter, for subsequent processing by the processor. Likewise, the first and second transceiver are configured to receive outgoing signals from the processor, or another component of the mobile device, and up convert these signals from baseband to RF frequency for transmission over the respective antenna.

It is contemplated that the mobile device, and hence the first wireless transceiver and a second wireless transceiver may be configured to operate according to any presently existing or future developed wireless standard including, but not limited to, Bluetooth, WI-FI such as IEEE 802.11 a,b,g,n, wireless LAN, WMAN, broadband fixed access, WiMAX, any cellular technology including CDMA, GSM, EDGE, 3G, 4G, 5G, TDMA, AMPS, FRS, GMRS, citizen band radio, VHF, AM, FM, and wireless USB.

In certain embodiments, the mobile device includes one or more systems connected to the second bus, which also interface with the processor. These devices include a global positioning system (GPS) module with associated antenna. The GPS module is capable of receiving and processing signals from satellites or other transponders to generate location data regarding the location of the GPS module. GPS is used herein to identify and provide data on the location of the mobile device, for example, the location of the mobile device in an airport. In certain embodiments, a gyroscope connects to the bus to generate and provide orientation data regarding the orientation of the mobile device. In certain embodiments, a magnetometer is provided to provide directional information to the mobile device. In certain embodiments, an accelerometer connects to the bus to provide information or data regarding shocks or forces experienced by the mobile device. In one configuration, the accelerometer and gyroscope generate and provide data to the processor to indicate a movement path and orientation of the mobile device.

In certain embodiments, the mobile device includes one or more cameras (still, video, or both) provided to capture image data for storage in the memory for transmission over a wireless or wired link or for authentication and verification based on data on a remote server. The one or more cameras may be configured to detect an image using visible light and/or near-infrared light. The cameras may also be configured to utilize image intensification, active illumination, or thermal vision to obtain images in dark environments. The processor may process image data to perform image recognition, such as in the case of, facial detection, item detection, facial recognition, item recognition, or bar/box code reading.

In certain embodiments, the invention includes a flasher and/or flashlight, such as an LED light, are provided and are processor controllable. The flasher or flashlight may serve as a strobe or traditional flashlight. The flasher or flashlight may also be configured to emit near-infrared light. A power management module interfaces with or monitors the battery to manage power consumption, control battery charging, and provide supply voltages to the various devices which may require different power requirements.

In certain embodiments, the invention includes a mobile device including a receive module and a transmit module. These software modules are configured to receive and transmit data to remote device, such as cameras, glasses, servers, cellular towers, or WIFI system, such as router or access points.

Also part of the mobile device is a location detection module configured to determine the location of the mobile device, such as with triangulation or GPS.

In other embodiments, the invention includes a facial detection module provided to execute facial detection algorithms while a facial recognition module includes software code that recognizes the face or facial features of an individual, such as to create numeric values which represent one or more facial features (facial biometric information) that are unique to the individual.

An information display module controls the display of information on the mobile device. The display may occur on the screen of the mobile device. An input/output module is configured to accept data from and display data on the mobile device. A local interface is configured to interface with other local devices, such as using Bluetooth® or other shorter range communication, or wired links using connectors to connected cameras, batteries, data storage elements. All of the software (with associated hardware) operate to provide the functionality described herein.

In certain embodiments, the invention includes an information display module that controls a display of information at the server. An individual input/output module controls an individual interface in connection with the local interface module. Also located on the server side of the system is a facial recognition module that is configured to process the image data from the mobile device. The facial recognition module may process the image data to generate facial data (biometric information) and perform a compare function in relation to other facial data to determine a facial match as part of an identify determination.

A database interface enables communication with one or more databases that contain information used by the server modules. A location detection module may utilize the location data from the mobile device for processing and to increase accuracy.

One or more databases or database interfaces are provided to facilitate communication with and searching of databases. In this embodiment the system includes an image database that contains images or image data for one or more individuals. This database interface may be used to access image data as part of the identity match process. Also part of this embodiment is a personal data database interface and privacy settings data module. These two modules operate to establish a privacy setting for individuals and to access a database that may contain privacy settings.

The invention also includes an authentication system with path parameters that are operable for performing facial recognition authentication with path parameters according to one embodiment of the invention. In certain embodiments, the system utilizes the features of the mobile device and server to generate a secure authentication system. This reduces and prevents fraud and increases security by combining several path parameters and/or device parameters, which must be met before individual is authenticated.

In certain embodiments, the system includes an encrypted facial recognition authentication system. In one embodiment, an authentication server, such as the server used by Homeland Security or CBP, may be configured to authenticate an individual to allow access to a secured area, such as an airplane, via the mobile device. The authentication server may be included as a part of a server located locally or the authentication server may be located remotely. In one embodiment, the authentication server may provide an authentication application for installation on the mobile device.

In certain embodiments, a mobile device with a camera is oriented so that the camera is positioned to capture an image of the individual's face. For example, an individual may use a front facing camera on a mobile device with a display screen and may confirm on the display screen that his or her face is in position to be imaged by the camera. Once the individual has oriented the device, the device may begin obtaining the authentication images of the individual. In one embodiment, the individual may optionally press a button on the device such as on a touchscreen or other button on the device to initiate the obtaining of the authentication images. The individual then moves his or her head relative to the mobile device to different positions as the device camera captures the individual's face from a plurality of angles or positions. When the above-mentioned front-facing camera is used, the individual may confirm that his or her face is being imaged by viewing the imaging on the display screen. The individual may optionally press the button to indicate that the imaging is completed. Alternatively the individual may hold the button during imaging, and then release the button to indicate that imaging is complete. In another alternative, the image is captured automatically by the mobile device without any input from the individual.

In another embodiment, the mobile device may include face detection. In this embodiment, the mobile device may detect the individual's face in multiple images, crop the images to include only the individual's face, and send, via a network, the images to the authentication server (i.e., a server operated by CBP). In certain embodiments, upon receipt of the enrollment images, the authentication server performs facial recognition on the image to determine biometric information ("authentication biometrics") for the individual. The authentication server may then associate the biometrics with the device and store the biometric information in the database. For added security, the mobile device and the authentication server may be configured to delete the images after the authentication biometrics of the individual are obtained and verified.

In another embodiment, the mobile device may send the images to the authentication server prior to performing face detection. The authentication server may then perform the face detection, facial recognition, and biometric information processing. In another embodiment, the mobile device may be configured to perform the facial detection, facial recognition, and biometric processing, and then send the results or data resulting from the processing to the authentication server to be associated with information authenticating and verifying the identity of the individual. This prevents sensitive personal data (images) from leaving the mobile device (i.e., the data is first encrypted prior to sending). In yet another embodiment, the mobile device may perform each of the above mentioned steps, and the mobile device may store the authentication information without sending any of the authentication biometrics or images to the server.

In one embodiment, the mobile device's gyroscope, magnetometer, and accelerometer are configured to generate and store data to obtain the authentication images. By using data from the accelerometer, magnetometer, and gyroscope, the system may check when an individual is ready to begin scanning. The data is thus used to determine when to start and stop the scan interval. The data may additionally include the time elapsed during scanning. This time may be measured to start and stop the imaging, or may be measured from the duration of imaging.

The data from mobile device may be sent to the authentication server. The authentication server associates and stores the biometrics, the device information, and account information to assess data analytics from the mobile device. Alternatively, the data generated by the gyroscope, magnetometer, and accelerometer may be sent to the server, and the server may process the data to determine various data analytics.

In one embodiment, the mobile device obtains a number of authentication images. Using facial detection, the mobile device detects the individual's face in each of the authentication images, crops the images, and sends the images to the authentication server. In another embodiment, the mobile device sends the images to the server, and the server performs facial detection. The authentication server may perform facial recognition on the authentication images to obtain biometric information. In another embodiment, the mobile device performs facial recognition to obtain the authentication biometrics and sends the authentication biometrics to the server.

In certain embodiments, the mobile device sends device information identifying the device taken during imaging, as well as the elapsed time during imaging to the server to qualify and quantify data analytics. The credentials received by the authentication server for the facial recognition system may thus comprise the device information, the authentication images or the authentication biometrics.

In certain embodiments, a server verifies that the image received from the mobile device sufficiently correspond with the information/image obtained on the server. For example, by using algorithms to process the characteristics of the face and light striking the face between the different images, the authentication server can determine that the face in the authentication images is three-dimensional, i.e. not a representation on a printed picture or video screen. Where the mobile device sends only the authentication biometrics to the server, the server may validate the realness or three-dimensional aspects of the individual imaged by comparing the biometric results of the different images.

In certain embodiments, the authentication server may then compare the image received from the mobile device with an image stored. In certain embodiments, the server compares the image from the device obtained during a boarding process to that stored on a server. In certain embodiments, the authentication biometrics may be compared with the biometrics on the server to determine whether they sufficiently correspond with the biometrics taken by the mobile device.

Accordingly, if the authentication server and/or mobile device determines that the image taken by the mobile device sufficiently corresponds with the image on the server, then the server or mobile device may verify that the identification of the individual attempting to gain secure access is verified. This avoids the cumbersome process of the individual having to manually scan or type verifying information on the mobile device.

The level of verification required to determine that the image obtained by the mobile device sufficiently corresponds with the image on the server may be set in advance. For example, the level may be a 99.9% match rate between the biometrics taken on the mobile device and the authentication biometrics. The required level may be static or elastic based on the established thresholds.

For example, the required level of confidence may be based on where and/or when the image is taken on the mobile device. In one embodiment, the authentication server may require a 99.9% match rate as the level of confidence when mobile device corresponds with the location or time that is considered "high risk." If, for example, GPS information shows the mobile device is in a foreign country, the authentication server may require a 99.99% match rate as the level of confidence to allow entry or may be denied entirely. Hence, the required match between data is elastic in that the required percentage match between images my change depending on various factors, such as time of day, location, date, or any other factor. In certain embodiments, the threshold match rates may be adjusted based on different desired levels of security. In certain embodiments, multiple servers (e.g., Homeland Security, CBP, TSA) may coordinate match thresholds to create a desired threshold.

In certain embodiments, the authentication server may grant or deny access based on a verification step. For example, if the authentication server verifies that there is a biometric match, then the server may authenticate the individual to allow access to the secure area. Alternatively, if the biometric credentials taken on the mobile device of the individual are not verified, the authentication server may transmit a message to display on the screen of the mobile device indicating that the authentication and/or verification attempt failed. The authentication server may then allow the individual to try again via the facial recognition or the authentication server may require the individual to enter typical identity credentials, such as a name, ticket, and/or passport.

In one embodiment, the server may allow three consecutive failed attempts before requiring an individual to manually provide a name, ticket, and passport. If in one of the attempts, the required level of confidence is met, then the individual may be verified and access may be granted. According to one embodiment, the authentication server may retain the information from each successive authentication attempt and combine the data from the multiple authentication attempts to achieve more accurate facial biometric information of the person attempting to authenticate. In addition, the level of confidence may be increased at each successive attempt to authenticate. In addition, by averaging the image data from several login attempts, the login data is perfected and improved.

The system provides a number of advantages. As one advantage, the facial recognition authentication system provides a real-time, seamless, secure system for sending encrypted facial data to a secure server for authentication and verification of an individual for access to a secure area. In addition, in certain embodiments a plurality of images are used as authentication images, histograms or other photo manipulation techniques may be used to determine if a digital screen is present in place of a human face in the images. For example, the system may check for light frequency changes in the captured images, or banding in an image which would indicate an electronic display generated the image, backlighting, suspicious changes in lighting, or conduct other analyses on the images by comparing the images to determine that the actual live individual is indeed alive, present, and requesting authorization and verification.

As yet another advantage not only must the imaged biometrics sufficiently correspond to the authentication biometrics, but also the mobile device information must match the authorized device information. For example, an application may only be downloaded to an authorized mobile device that has an approved, secure digital camera.

In certain embodiments, the individual faces the mobile device at different positions relative to his or her head while keeping his or her face visible to the camera as it is moved. In certain embodiments, the camera takes the images of the face. During imaging, the speed and angle of the current individual is measured. Further continuous imaging and detection of the face throughout the process can prevent fraud. This is because a fraud attempt cannot be made by rotating images in and out of the front of the camera.

In certain embodiments, the system provides enhanced security for authenticating an individual using the mobile device. In certain embodiments, the system may use at least any one or more of the following in any number of combinations to securely authenticate the individual: physical device verification, facial recognition including the size of the face in the image, a face detected in every frame during the movement, pixels per square inch, color bits per pixel, type of image, and GPS information. In certain embodiments, the invention includes an emotion-based facial recognition authentication to confirm that the face captured by the mobile device camera is in fact from an actual person. In certain embodiments, the emotion-based authentication includes a facial expression, for example, a smile, frown, etc. In other embodiments, the emotion-based authentication includes a real-time facial expression, for example, a smile, frown, etc.

In certain embodiments, the invention includes an alerting capability. For example, in one embodiment, when the systems and methods described herein are used for authentication and verification during boarding of an airplane, the system and method can include, for example, an alerting capability that alerts a gate agent or other individual that a passenger is, for example, carrying a child and should not be seated in an exit row, and/or a passenger is using a service animal and may require additional assistance, and/or a passenger requires additional screening because the passenger is a foreign national traveling through the United States to a foreign destination. In certain embodiments, the alerting capability can be customized based on the type of alert needed and how the systems and methods are utilized. For example, in another illustrative embodiment, when the systems and methods described herein are used for authentication and verification of a student entering a school, the alerting capability may alert the school (e.g., principal or administrator) that the student is suspended and should not be allowed access to the school.

In certain embodiments, it is also contemplated that the system and method of facial recognition may be linked to various separate databased including, but not limited to, CBP, TSA, et.

In certain embodiments, the invention also includes system for collecting various data (e.g., data analytics). In certain embodiments, the mobile device camera may further conduct an analysis on the images to estimate, for example, at least one of a gender, an approximate age, and an ethnicity to determine accuracy and speed of the system. The authentication system may then further store an individual's estimated gender, age, and ethnicity. Thus when the individual later attempts to authenticate with the system, the system will compare derived gender, age, and ethnicity obtained from authentication images (using biometric analysis to determine such data or estimates thereof based on processing). The system may make the gender, age, and ethnicity estimations based on a single image during the authentication process or based on multiple images. For example, the authentication system may use an image from the plurality of images that has an optimal viewing angle of the individual's face for the analysis. In other embodiments, a different image may be used for each analysis of age, gender, and ethnicity when different images reveal the best data for the analysis. The authentication may also estimate the gender, age, and ethnicity in a plurality of the images and average the results to obtain overall scores for a gender, age, and ethnicity.

In certain embodiments, to facilitate imaging, the screen on the mobile device may additionally be displayed with a white background, and the brightness of the screen may be increased to light up the individual's face in dark environment. For example, a portion of the display could provide video feedback for the individual to ensure he or she is imaging himself or herself, while the remaining portion of the display is configured to display a bright white color. In very dark situation, an LED flash on the back side of the mobile device and the back facing camera may be used. Alternatively, the camera may be configured to create an image using infrared light or other night vision techniques.

In certain embodiments, the display or other light source on the mobile device may further be utilized to provide additional security measures. During the authentication process, light from the display or other light source is projected onto the individual's face and eyes. This projected light may then be detected by the camera of the mobile device during imaging. For example, the color tone detected on the skin, or a reflection of the light off of the cornea of an individual's eye may be imaged by the camera on the mobile phone. Because of this, random light patterns, colors, and designs may be utilized to offer further security.

In certain embodiments, the system may also process the images received from the mobile device to determine if the images are of sufficient quality. For example, the system may check the images for blurriness caused by the images being out of focus or by the camera lens being obscured by fingerprints, oils, etc. The system may alert that individual that the quality of the images is insufficient (or too bright or too dark) and adjust a focus, exposure, or other parameter, or to clean the lens of the camera.

In certain embodiments, the system may also utilize an autofocus feature when the mobile device camera is equipped with such. For example, the system checks to ensure that the sharpness of the image changes throughout as the camera perform auto-focusing. In another embodiment, the system may control the autofocus so that the camera focuses on a first location or distance to check for sharpness (in focus) of a portion of the image containing a face. The system then controls the camera to focus at a second location or distance where the presence of a face is not detected and check for sharpness (in focus) of a portion of the image.

The system may also control the auto-focus of the device to check for different focal lengths of different particular features in the image. For example, when a person's face is imaged from the front, a person's ear is expected to have a different focal length (more distant) than the tip of a person's nose.

In certain embodiments, the server may also be configured to store or delete the authentication images after a predetermined length of time.

It is noted that each of the above embodiments, modifications, and enhancements may be combined in any combination as necessary to create multiple layers of security for authentication. For example, the facial recognition may be combined with additional security verifications, or operate independently of these for authentication.

In various embodiments, a database may include relational, hierarchical, graphical, blockchain, or object-oriented structure and/or any other database configurations. The databases may also include a flat file structure wherein data may be stored in a single file in the form of rows and columns, with no structure for indexing and no structural relationships between records. For example, a flat file structure may include a delimited text file, a CSV (comma-separated values) file, and/or any other suitable flat file structure. In certain embodiments, common database products that may be used to implement the databases include DB2 by IBM (Armonk, N.Y.), various database products available from ORACLE Corporation (Redwood Shores, Calif.), MICROSOFT Access or any other suitable database product. In certain embodiments, the databases may be organized in any suitable manner, for example, as data tables or lookup tables. Each record may be a single file, a series of files, a linked series of data fields or any other data structure.

In certain embodiments, the blockchain structure may include a distributed database that maintains a growing list of data records. The blockchain may provide enhanced security because each block may hold individual transactions and the results of any blockchain executables. Each block may contain a timestamp and a link to a previous block. Blocks may be linked because each block may include the hash of the prior block in the blockchain. The linked blocks form a chain, with only one successor block allowed to link to one other predecessor block.

In one embodiment, biometric data implemented in accordance with an embodiment of the invention is incorporated as a blockchain. As used herein, a blockchain broadly refers to a data structure that is tamper evident and appendable. In certain embodiments, a block chain further refers to a decentralized, distributed data structure whose contents are replicated across a number of systems. These contents are stored in a chain of fixed structures commonly referred to as "blocks," or a "hash" such as individual information block "1," block "2," and so forth, through block "n" wherein each block includes a specific piece of an individual's information. In certain embodiments, each of these blocks contains certain information about itself, such as a unique identifier, a reference to its previous block, and a hash value generated from the data it contains. As an example, individual block "2" would contain a reference to individual block "1" yet their respective hashes values would be different as they contain different data.

Blockchains may be implemented in different ways and for different purposes. However, these different implementations typically have certain common characteristics. For example in certain embodiments, blockchains are generally distributed across various systems, each of which maintains a copy of the blockchain. Updates to one copy of the blockchain, such as the addition of a new individual's block "n," results in corresponding updates to the other copies. Accordingly, the contents of the blockchain, including its most recent updates, are available to all authorized users of the blockchain, who in turn use their own systems to authenticate and verify each new block. This process of authentication and verification ensures that the same transaction does not occur more than once. Furthermore with distributed types of block chains, the legitimacy of a given block, and its associated contents is only certified once a majority of participants agree to its validity.

In general, the distributed and replicated nature of a blockchain makes it difficult to modify historical records without invalidating any subsequent blocks added thereafter. As a result, the individual data within a given blockchain is essentially immutable and tamper-evident. However, this immutability and tamper-evidence does not necessarily ensure that the user behavior data recorded in the blockchain can be accepted as an incontrovertible truth. Instead, it simply means that what was originally recorded was agreed upon by a majority of the blockchain's participants.

Additionally certain embodiments include an appreciation that every transaction in a blockchain is serialized (i.e., stored in a sequence). In certain embodiments, every transaction in a block chain is time-stamped, which is useful for tracking interactions between participants and verifying various information contained in, or related to, a blockchain. Furthermore, instructions can be embedded within individual blocks of a blockchain. These instructions, in the form of computer-executable code, allow transactions or other operations to be initiated if certain conditions are met.

In certain embodiments, the individual data element is used to generate an individual block. In certain embodiments, the resulting elements are in turn combined to generate an individual block, such as block "n." The resulting block is then appended to a target individual's blockchain, such as individual blockchain. As used herein, an individual block broadly refers to a blockchain block implemented to contain various individual data. As likewise used herein, individual data broadly refers to any data associated with an individual, for example, name, birthdate, driver's license data, passport data, flight information, etc.

In one illustrative embodiment, a plurality of one or more individual's data (e.g., biometric data) is stored in various blocks on a blockchain and retrieved and authenticated by various parties (e.g., third parties) for a variety of uses including, but not limited to, access to a secure area, immigration and passport control, access to financial records or financial accounts, access to virtual entry locks (e.g., on an automobile or to a building or home), etc.

In certain embodiments, the blockchain includes an official validation "master key" that allows access and validation of all data to authenticate an individual's identity.

While various embodiments of the invention have been described, it will be apparent to those of ordinary skill in the art that many more embodiments and implementations are possible that are within the scope of this invention. In addition, the various features, elements, and embodiments described herein may be claimed or combined in any combination or arrangement.

What is claimed is:

1. A system comprising:
   at least one data processor; and
   memory comprising instructions which, when executed by the at least one data processor, cause the at least one data processor to perform operations comprising:
      receiving biometrics data characterizing a biometric parameter of an individual, wherein the biometric data is received from a client device including a camera;
      determining that the received biometrics data matches previously-received biometric data characterizing the individual, wherein determining that the received biometrics data matches previously-received biometrics data further comprises,
      comparing a feature of the individual characterized by the received image data with a discernable physical feature of the individual characterized by the previously-received image data;
      in response to determining that the received biometrics data does not match the previously received biometrics data, determining denial data characterizing a denial of access to a secure area; and
      providing the denial data to cause the individual to be permitted to be denied access to the secure area;
      in response to determining that the received biometrics data matches the previously-received biometrics data, determining access data characterizing an authorization of access to the secure area of a facility by the individual and a period of accessibility during which the individual is permitted to access the secure area;
      determining a purge command characterizing instructions for purging the determined access data at an expiration of the period of accessibility;
      providing the access data to cause the individual to be permitted to access the secure area during the period of accessibility; and
      providing the purge command to cause to the access data to be purged at the expiration of the period of accessibility.

2. The system of claim 1, wherein the period of accessibility is defined according to one of an elapsed time or an occurrence of a monitored event at the facility.

3. The system of claim 1, wherein the operations further comprise: determining a delete command characterizing instructions for deleting the image data from the client device; and providing the delete command to the client device to cause the image data to be deleted from the client device.

4. The system of claim 1, wherein the determining that the received biometrics data matches the previously-received biometrics data further includes:
   determining a measure of similarity of the feature and the discernable physical feature characterizing a level of correlation between the feature and the discernable physical feature; and
   determining that the measure of similarity exceeds a predetermined threshold.

5. The system of claim 4, wherein the operations further comprise receiving geolocation data characterizing a location of the client device, and wherein the predetermined threshold is based on the received geolocation data.

6. The system of claim 4, wherein the discernible physical feature of the individual is associated with identification data characterizing an identity of the individual and with authorization data characterizing an authorization status for access of the secure area by the individual, and wherein the access data is determined based on the identification data and the authorization data.

7. The system of claim 1, wherein the received biometrics data and the previously-received biometrics data characterize one or more of a fingerprint scan of the individual, an iris scan of the individual, a retinal scan of the individual, a facial recognition scan of the individual, a dynamic gait of the individual, a body geometry scan of the individual, and DNA of the individual.

8. The system of claim 1, wherein the operations further comprise:
   providing historical data characterizing the access data, the biometrics data, identification data characterizing an identity of the individual authorization data characterizing an authorization status for access of the secure area by the individual, to a blockchain for storage therein.

9. A method comprising:
   receiving biometrics data characterizing a biometric parameter of an individual, wherein the biometric data is received from a client device including a camera;
   determining that the received biometrics data matches previously-received biometrics data characterizing the individual, wherein determining that the received biometrics data matches previously-received biometrics data further comprises,
   comparing a feature of the individual characterized by the received image data with a discernable physical feature of the individual characterized by the previously-received image data;
   in response to determining that the received biometrics data does not match the previously received biometrics data, determining denial data characterizing a denial of access to a secure area; and
   providing the denial data to cause the individual to be permitted to be denied access to the secure area;
   in response to determining that the received biometrics data matches the previously-received biometrics data, determining access data characterizing an authorization of access to the secure area of a facility by the individual and a period of accessibility during which the individual is permitted to access the secure area;
   determining a purge command characterizing instructions for purging the determined access data at an expiration of the period of accessibility;
   providing the access data to cause the individual to be permitted to access the secure area during the period of accessibility; and
   providing the purge command to cause to the access data to be purged at the expiration of the period of accessibility.

10. The method of claim 9, wherein the period of accessibility is defined according to one of an elapsed time or an occurrence of a monitored event at the facility.

11. The method of claim 9, further comprising: determining a delete command characterizing instructions for deleting the image data from the client device; and providing the delete command to the client device to cause the image data to be deleted from the client device.

12. The method of claim 9, wherein the determining that the received biometrics data matches the previously-received biometrics data further includes: determining a measure of similarity of the feature and the discernable physical feature characterizing a level of correlation between the feature and the discernable physical feature; and determining that the measure of similarity exceeds a predetermined threshold.

13. The method of claim 12, further comprising receiving geolocation data characterizing a location of the client device, and wherein the predetermined threshold is based on the received geolocation data.

14. The method of claim 12, wherein the discernible physical feature of the individual is associated with identification data characterizing an identity of the individual and with authorization data characterizing an authorization status for access of the secure area by the individual, and wherein the access data is determined based on the identification data and the authorization data.

15. The method of claim 9, further comprising:
   providing historical data characterizing the access data, the biometrics data, identification data characterizing an identity of the individual authorization data characterizing an authorization status for access of the secure area by the individual, to a blockchain for storage therein.

* * * * *